United States Patent [19]

Nelson et al.

[11] Patent Number: 4,700,924
[45] Date of Patent: Oct. 20, 1987

[54] PRESSURE ENERGIZED ROTARY HYDRAULIC SEAL

[75] Inventors: John E. Nelson, Houston; Raymond J. Smith, Friendswood, both of Tex.

[73] Assignee: Vetco Gray, Inc., Houston, Tex.

[21] Appl. No.: 915,565

[22] Filed: Oct. 6, 1986

[51] Int. Cl.$^4$ .................. F16K 31/124; F15J 15/40
[52] U.S. Cl. ................................. 251/58; 92/13.6; 92/68; 92/106; 92/136; 166/319; 175/318; 251/229; 251/250; 277/27; 277/188 R
[58] Field of Search ............... 74/25, 29, 30; 92/13, 92/13.3, 13.6, 13.8, 68, 106, 136, 138, 60.5; 166/319; 175/318; 251/58, 229, 250; 277/27, 165, 188 R

[56] References Cited

U.S. PATENT DOCUMENTS

| | | | |
|---|---|---|---|
| 3,020,057 | 2/1962 | Gomet | 92/106 |
| 3,806,082 | 4/1974 | Kellner | 251/58 |
| 4,339,108 | 7/1982 | Daniluk | 251/58 |
| 4,456,217 | 6/1984 | Winegeart et al. | 251/58 |
| 4,534,569 | 8/1985 | Ishitoni et al. | 277/27 |
| 4,563,940 | 1/1986 | Wuhrer | 92/106 |

Primary Examiner—George L. Walton
Attorney, Agent, or Firm—Dodge, Bush & Moseley

[57] ABSTRACT

A pressure actuated hydraulic seal ring is disclosed for sealing to a rotating cylindrical member. The seal ring clears the rotating member when no hydraulic fluid is applied to its outer diameter. When hydraulic pressure is introduced to its outer diameter, a net compressive force is applied to the seal ring causing it to collapse in radially. The rotating cylindrical member includes a port through an external cylindrical surface which communicates with a conduit in the wall of the cylindrical member. The seal ring includes two inner sealing surfaces which straddle the port in the cylindrical surface where the ring is non-rotatingly supported by a ring retainer disposed about the exterior of the cylindrical surface. A passage extends from the outer diameter of the seal ring to a channel between the two inner sealing surfaces. When the seal ring collapses radially, the two sealing surfaces seal against the rotating external cylindrical surface providing a hydraulic fluid communication path from the outer diameter via the passage in the seal ring, the channel between the two inner sealing surface and the port and the conduit of the cylindrical member. The seal ring may advantageously be used to communicate hydraulic fluid for operation of a valve in the flow path of a rotating tubular member.

13 Claims, 6 Drawing Figures

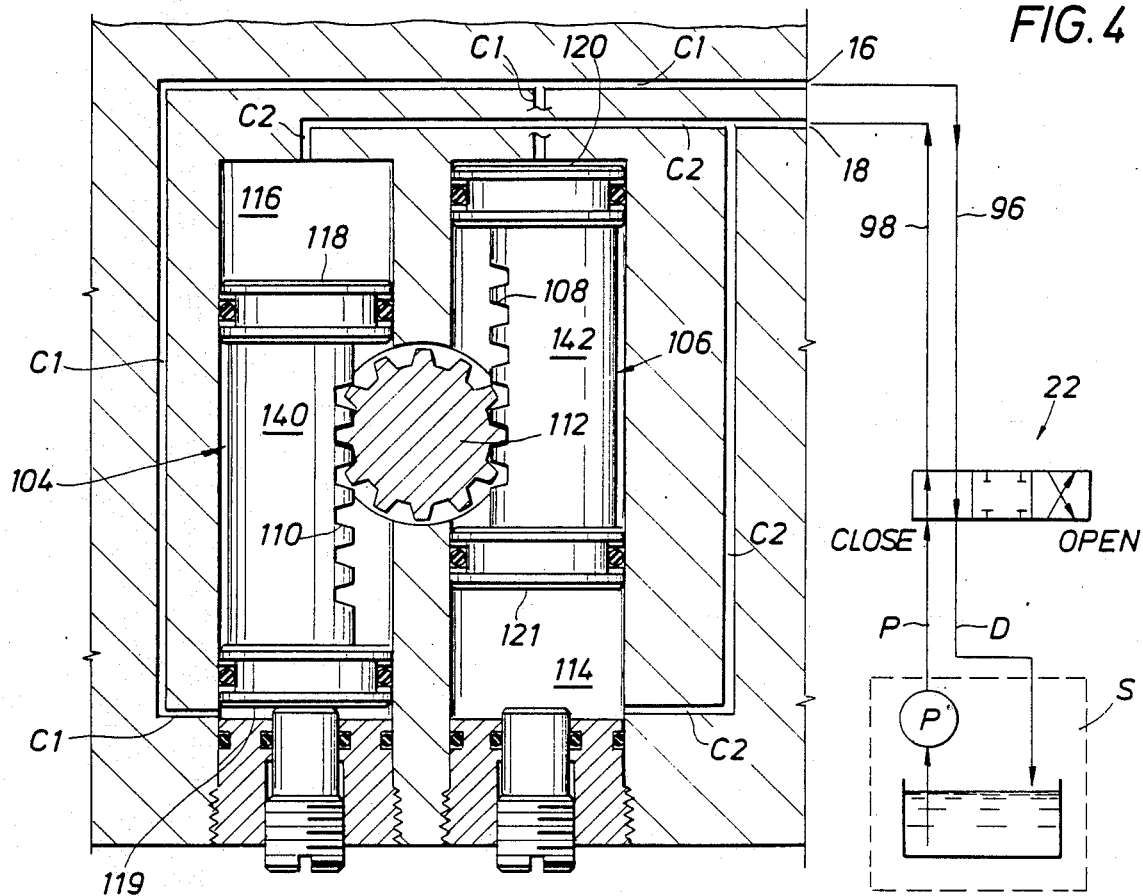
FIG. 4
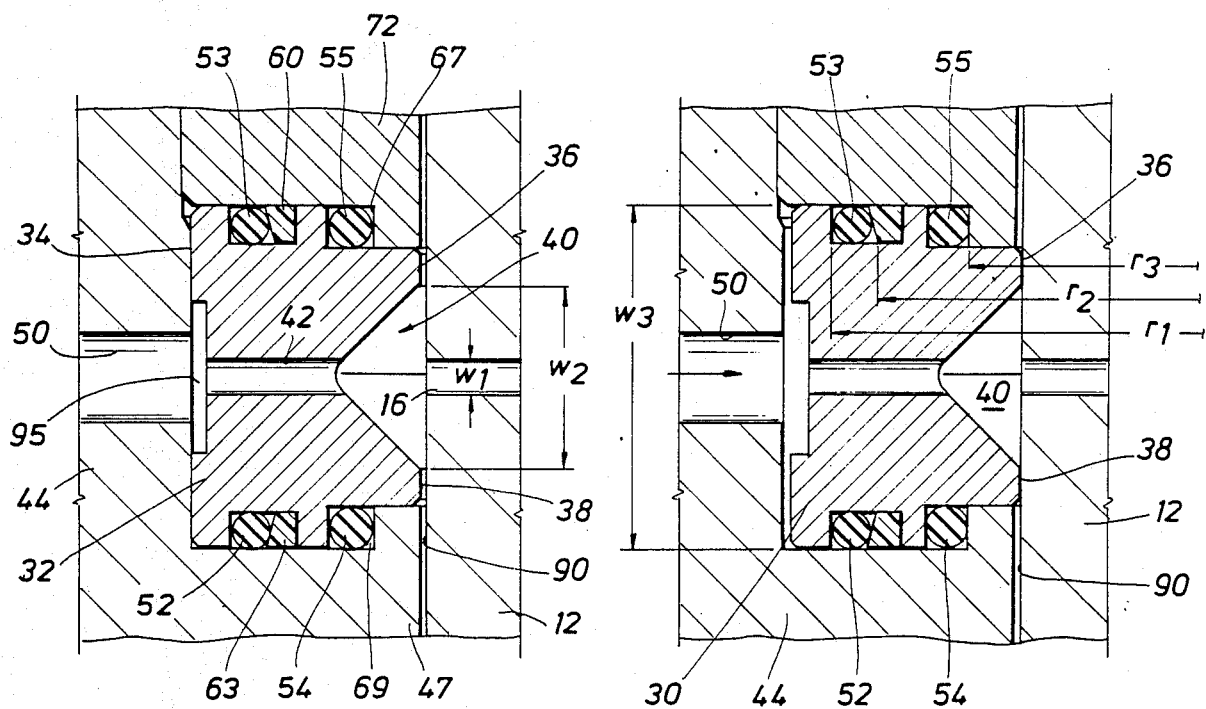
FIG. 5
FIG. 6

PRESSURE ENERGIZED ROTARY HYDRAULIC SEAL

BACKGROUND OF THE INVENTION

1. Field of the Invention

This invention relates generally to rotary seals. In particular the invention relates to normally non-contacting seals coaxially disposed about a rotating member, which when actuated by hydraulic pressure, seal about an external cylindrical surface of the rotating member. More particularly, the invention relates to a pressure actuated hydraulic seal for communicating hydraulic fluid to a valve actuator for opening or closing a flow path through the rotating member.

2. Description of the Prior Art

Prior art machanisms for sealing between a stationary member and a rotating member while applying pressurized hydraulic fluid from the stationary member to the rotating member have generally required continuous contact of one or more seals between the stationary member and the rotating member. One such arrangement is illustrated in U.S. Pat. No. 4,339,108 to Daniluk for an upper kelly valve. Daniluk shows a stationary ported member sealed with respect to a rotating member for directing hydraulic fluid to the rotating member in order to control a valve in the flow path of the rotating member. The seals between the stationary member and the rotating member are continuously contacting O-ring seals which may suffer thermal runaway under requirements of high rpm and pressure necessary for such kelly valves.

As the Daniluk apparatus illustrates, standard hydraulic seals for sealing between a stationary member and a rotating member are in constant contact with the sealing surface of the rotating member. Relative motion of the stationary member with the rotating member results in wear on the seal and the sealing surface of the rotating member along with frictional heating. As surface speeds increase, the frictional heating can be sufficient to degrade and eventually destroy the seal through overheating.

IDENTIFICATION OF OBJECTS OF THE INVENTION

It is an object of this invention to provide pressure actuated sealing apparatus for a path of pressurized fluid from the stationary member to the rotating member so that the seal of the stationary member clears the sealing surface when no pressure is applied and seals only when pressure is applied with the result that no degradation of the seal through heating effects results when pressurized fluid is not applied.

It is another object of the invention to provide sealing apparatus between a stationary member and a rotating member for applying pressurized hydraulic fluid to a valve of the rotating member while sealing between the rotating member and the stationary member only when pressurized hydraulic fluid is applied.

SUMMARY

These objects as well as other advantages and features of the invention are incorporated in an apparatus which includes a pressure energized hydraulic seal which clears the external cylindrical surface of a rotating member or shaft and then is moved into contact with the shaft to seal against it when pressure is applied to the seal, thereby eliminating problems of wear and frictional heating when pressure is not applied to the rotating system. The apparatus establishes a sealed communication path from a source of pressurized hydraulic fluid to a conduit in a rotating member which has a port which opens to an external cylindrical surface of the rotating member and which connects with the conduit in the rotating member. A seal retainer is non-rotatingly coaxially placed about the external cylindrical surface of the rotating member.

The apparatus includes a deformable seal ring coaxially secured by the seal retainer about the external cylindrical surface of the rotating member at the port through the cylindrical surface of the rotating member. The seal ring has an internal diameter which is slightly larger in its undeformed state than the external diameter of the rotating member. The seal ring includes one or more internal conduits or passages between its outer diameter and its inner diameter. An hydraulic valve is provided for applying the pressurized hydraulic fluid to the outer diameter of the seal ring, causing it to deform into sealing contact with the external cylindrical surface of the shaft. The seal ring thereby establishes fluid communication between the source of pressurized hydraulic fluid and the conduit in the cylindrical member via the conduit in the seal ring and the port in the cylindrical member.

The seal ring includes two inner ring sealing surfaces axially separated from each other by a distance greater than the axial width of the port. An annular channel is disposed between the two sealing surfaces of the seal ring. The ring is axially disposed with respect to the port of the rotating member such that the two sealing surfaces are on opposite sides of the port.

Primary seals are placed radially inwardly from the outer diameter of the seal ring for sealing the ring with respect to the seal retainer. The effective piston area for deflecting the seal ring is determined by the external seal ring width and the external diameter of the primary seals. When pressure is applied at the seal ring outer diameter, the total inward radial force is the seal circumference at the primary seals multiplied by the seal ring width. For applications of the apparatus capable of delivering high flow rates relative to the seal ring passage areas, the pressure drop through the passages is sufficient to lower the pressure beneath the primary seal to cause only a small radially outward force on the seal ring, thereby insuring that the seal ring has enough net inward radial force applied to it to cause its two inner ring sealing surfaces to seal against the rotating shaft.

For seal rings of relatively inflexible material, or a low volume hydraulic system, secondary seals for sealing the seal ring to the retainer is provided at a diameter smaller than that of the primary seal member. The effective piston area under the secondary seals is smaller than the piston area atop the primary seals thereby insuring that a sufficiently large not inward force can be developed to deflect the seal ring.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which:

FIG. 4 is a section taken along lines 4—4 of FIG. 1 showing a cross-sectional view of push-pull pistons cooperating with a pinion gear attached to a valve shaft of the rotating member;

FIG. 5 is a partial cross-sectional view of a seal ring in its relaxed state showing no contact with the exterior cylindrical surface of the rotating member; and FIG. 6 illustrates the state of the sealing ring after hydraulic pressure has been applied to its exterior surface operably deforming it into sealing engagement with the rotating member.

DESCRIPTION OF THE INVENTION

Figure 1:
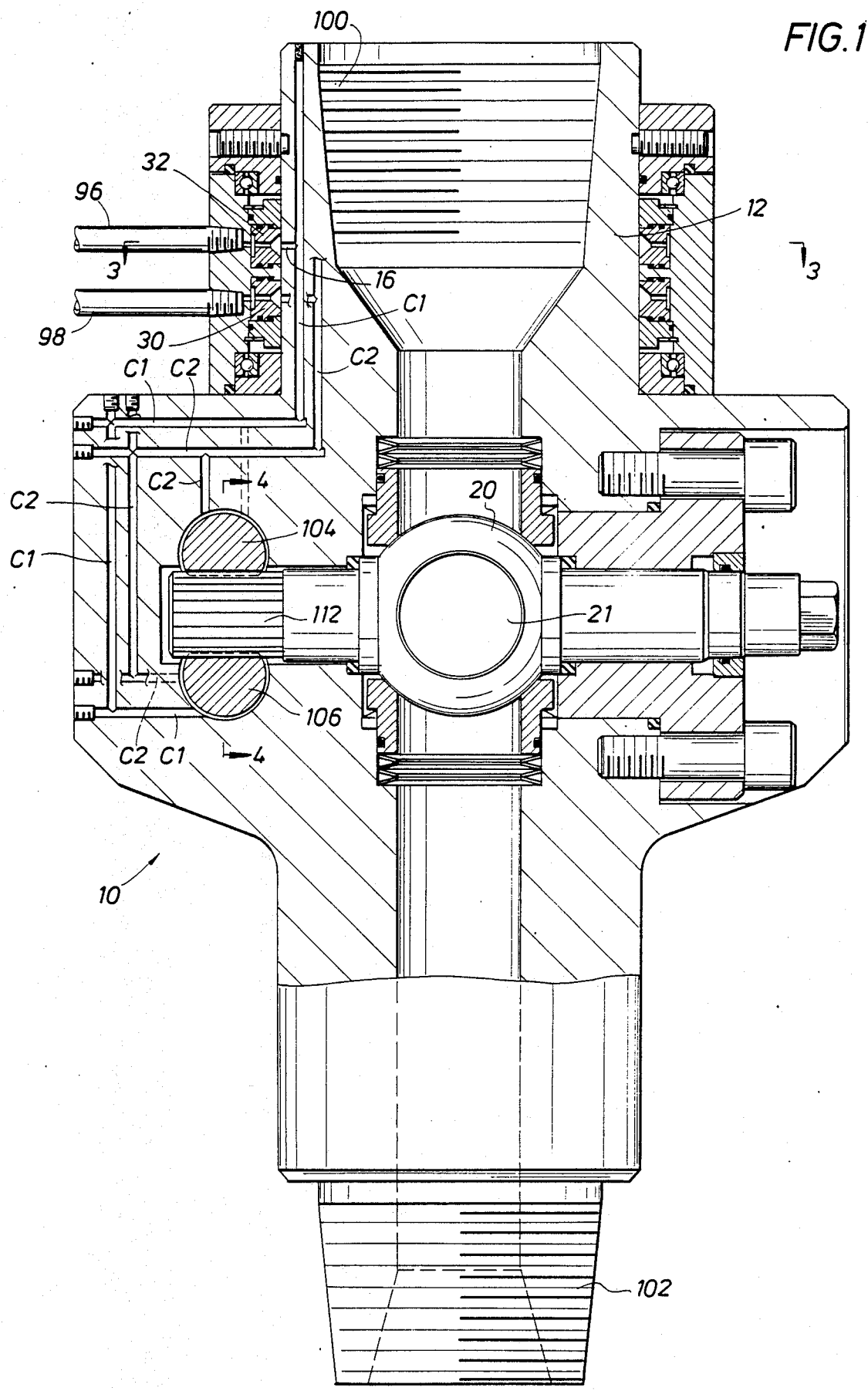
FIG. 1 is a side view, primarily in section, of a remotely controllable valve for a flow path of a rotating member with normally non-contacting seals for applying pressurized hydraulic fluid to an actuator mounted with the rotating member.

FIG. 1 illustrates a remotely operably valve 10, according to the invention. A preferred embodiment of the valve 10 is its application as a drilling rig kelly valve. In that application a drilling rig kelly may be secured either above or below the valve 10 by threading with either the top internal threads 100 or the lower external threads 102 as known by those of skill in the drilling art.

The remotely operably valve 10 rotates with a kelly attached above or below tubular housing 12. A flow passage 14 extends the length of the tubular housing 12 and of course communicates with the drilling fluid system of the drilling rig. A valve, such as ball valve 20, is sealingly disposed in the flow passage 14 to prevent flow through the flow passage, as illustrated in FIG. 1, or to allow flow through it as when the valve is turned ninety degrees about its lateral axis. Other valves may of course be used instead of a ball valve. Turning valve 20 by ninety degrees aligns opening 21 of the valve 20 with the flow passage 14 thereby allowing fluid, such as drilling fluid to pass through it. The valve 20 may be closed, as illustrated in FIG. 1 to prevent high pressure well fluids from flowing up through a drilling string to the drilling rig floor.

The valve 20 may be turned between ninety degree positions by turning a shaft connected between pinion 112 and the valve 20. Pistons 104 and 106, connected in a push-pull arrangement, are connected to pinion 112 to cooperatively turn the valve between its open and closed positions.

FIG. 4 illustrates in more detail the operation of pistons 104 and 106 and their connection to pinion 112. Piston 104 is disposed in a chamber 116 and includes a top face 118 and bottom face 119. The top and bottom faces 118, 119 are connected by a member 140 having a rack 110 engaging one side of pinion 112. Piston 106 is disposed in a chamber 114 and includes a top face 120 and a bottom face 121. A connecting member 142 between faces 120 and 121 includes a rack 108 engaging the other side of pinion 112. The pistons are connected to pinion 112 such that when piston 104 is in the downward position, piston 106 is in the upward position in their respective chambers 116 and 114, and vice versa.

As illustrated partially schematically in FIG. 4, hydraulic conduits C1 extend from port 16 to the chamber 114 at a position facing upper piston surface or face 120 and to the chamber 116 at a position facing lower piston surface or face 119. Hydraulic conduits C2 extend from port 18 to the chamber 114 at a position facing lower piston surface or face 121 and to the chamber 116 at a position facing upper piston surface 118.

Pressure actuated seals connect to stationary conduits 96 and 98 to ports 16 and 18, which rotate with housing 12. Such seals are illustrated in FIGS. 1, 2, 3, 5 and 6 and are discussed in detail below. A three position hydraulic valve 22 connects conduits 98 and 96 alternatively between a high pressure line P and a drain line D of a pressurized hydraulic source S. When the valve 22 is in the closed position as illustrated, high pressure is applied via port 18 and conduits C2 to the upper face 118 of piston 104 and to the lower face 121 of piston 106. Hydraulic fluid previously in the chambers 116 and 114 is directed to the drain D of source S via conduits C1, port 16 and conduit 96.

After the valve has been moved to the closed position illustrated in FIG. 1, the hydraulic valve 22 is returned to its center position and the pistons 104 and 106 remain in their relative positions as illustrated. If it is desired to open valve 20, hydraulic valve 22 is moved to the open position and hydraulic pressure is applied via conduit 96, port 16 and conduits C1 and acts against face 120 of piston 106 and face 119, driving piston 106 down and piston 104 up. Such action turns pinion 112 causing ball valve 20 to be driven to its open position. Hydraulic fluid previously in chambers 114 and 116 is driven via conduits C2 to the drain of supply S via conduit 98. The hydraulic valve 22 is then returned to the center position.

Figure 2:
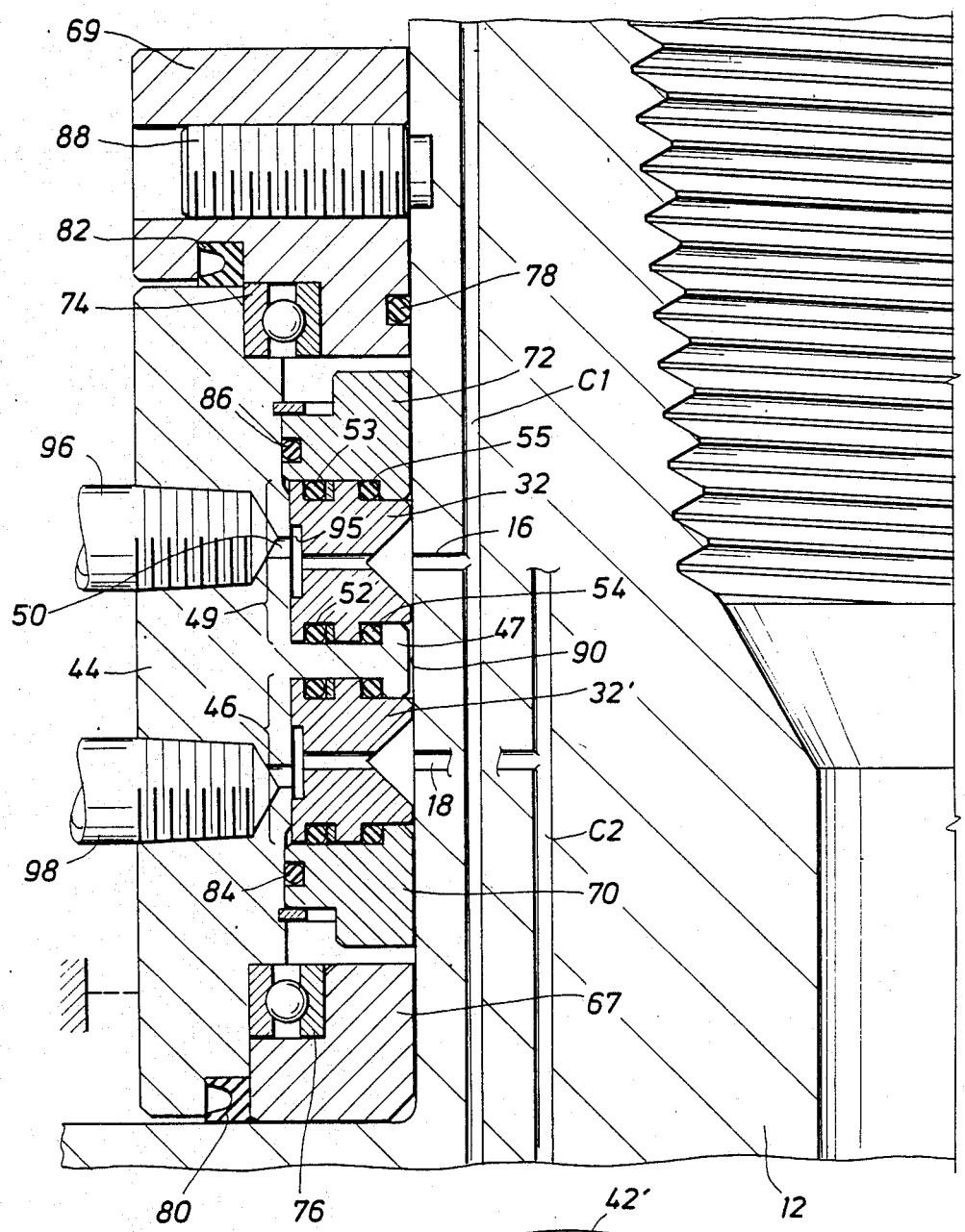
FIG. 2 is an enlarged sectional view of an hydraulic sealing mechanism in which normally non-contacting seal rings are disposed about the cylindrical surface of a portion of the rotating member.
Figure 3:
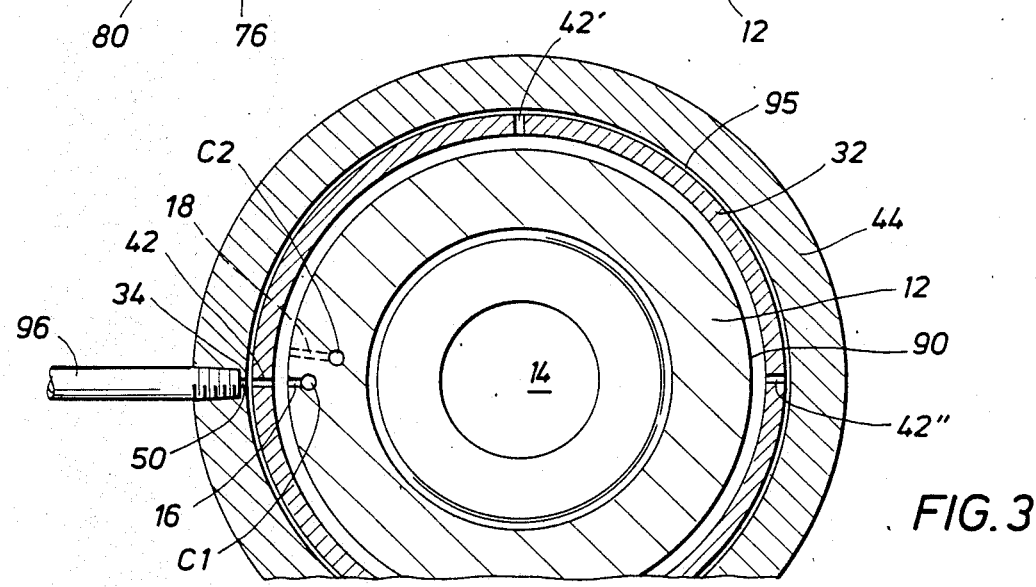
FIG. 3 is a section taken along lines 3—3 of FIG. 1, showing a partial downward cross-sectional view of a seal ring as it encircles the rotating member.

FIGS. 2 and 3 illustrate the hydraulically actuated sealing mechanisms which couple non-rotating conduits 96 and 98 to conduits C1 and C2 which rotate with tubular housing 12. A top rotating bearing retainer 69 is fixed to housing 12 by means of threaded bolt or anchor pin 88 and rotates with housing 12. Lower rotating bearing retainer 67 is fixed to housing 12 for example by welding. A non-rotating outer seal retainer 44 is coaxially disposed about the exterior surface 90 of housing 12 and is rotatingly supported by upper bearing assembly 74 and lower bearing assembly 76 with respect to upper rotating retainer 69 and lower rotating retainer 67.

A deformable seal ring 32' is disposed in an annular retaining slot 46 defined by the annular space between annular extension 47 of outer seal retainer 44 and a lower retainer ring 70. Similarly, deformable seal ring 32 is disposed in an annular retaining slot 49 defined by the annular space between annular extension 47 and an upper retaining ring 72.

Sealing is provided between rotating top bearing retainer 69 and stationary outer seal retainer 44 by means of face seal 82. Sealing between the outer seal retainer 44 and housing 12 is accomplished with face seal 80. An O-ring 78 seals top rotating bearing retainer 69 with respect to housing 12 thereby preventing a pressurized fluid path to anchor pin 88. O-rings 84 and 86 respectively seal lower retainer ring 70 and upper retainer ring 72 with respect to outer seal retainer 44.

Upper and lower deformable seal rings 32 and 32' are disposed respectively in slots 49 and 46. The deformable seal rings 32 and 32' are essentially identical in construction and are fabricated of a strong, yet deformable, flourine containing resin material known as the trademarked name, TEFLON. In a preferred embodiment of seal rings 32 and 32', the TEFLON material is reinforced with fiberglass, but resilient metallic substances may also be used as seal ring materials. FIG. 5 shows seal ring 32 in its undeformed or relaxed state.

As FIG. 5 illustrates, the inner diameters of upper retainer ring 72 and annular extension 47 are slightly larger than the outer diameter of housing 12 of the rotating member. Likewise, seal ring 32 is sized within retaining slot 49 such that its internal diameter is slightly larger than the outer diameter of the housing 12. In its relaxed state, the seals 32 and 32' and the members 72, 47 and 70 facing the exterior cylindrical surface of housing 12 do not contact exterior surface 90 of housing 12 thereby preventing frictional heating which would be caused by rotating contact.

Seal ring 32 (as well as ring 32') includes upper and lower sealing surfaces 36 and 38 which face the exterior surface 90 of rotating member 12. The seal ring 32 is disposed relative to port 16 so that sealing surfaces 36 and 38 straddle the opening of port 16 on the exterior cylindrical surface of housing 12. As shown, the opening of port 16 is of a width W1 which is smaller than the axial separation W2 of the sealing surfaces 36 and 38. An annular channel 40 is formed in ring 32 between surfaces 36 and 38. Preferably four passages 42, 42', 42", etc. (as illustrated in FIG. 3) are provided between the annular channel 40 and an annular groove 95 in the outer surface 34 of sealing ring 32. Pressure inlet 50 provides hydraulic fluid communication between a pressure fitting connecting conduit 96 and the groove 95 and external circumferential outer surface 34 of seal ring 32. Outer or primary sealing O-rings 53 and 52 are provided respectively in slots 60 and 63 of the circumferential walls of sealing ring 32. Inner or secondary sealing O-rings 55 and 54 are provided respectively in slots 67 and 69 defined respectively between upper retaining ring 72 and the upper lateral wall of sealing ring 32 and between annular extension 47 and the lower lateral wall of sealing ring 32.

FIG. 3 illustrates the non-contacting or relaxed state of sealing ring 32 in its coaxial placement about the external cylindrical surface 90 of tubular member 12. FIG. 3 illustrates that hydraulic fluid, when applied to the external surface 34 of sealing ring 32 via conduit 96 and pressure inlet 50 is applied to circumferential groove 95 and passages 42, 42', 42" and 42''' (not shown).

As FIG. 6 illustrates, once pressurized hydraulic fluid is applied to inlet 50, that pressure acting circumferentially at the radius $r_1$ to the outer O-rings 53 and 52 causes the deformable ring 30 to deform inwardly until sealing surfaces 36 and 38 form a rotating seal with external surface 90 of housing 12. When hydraulic pressure is applied via inlet 50, the total inward radial force squeezing sealing ring toward external surface 90 is the seal circumference at the outer O-ring seal 53 ($c = 2\pi \cdot r_1$) multiplied by its seal width, W3. For systems capable of delivering high flow rates relative to fluid passage areas of passages 42, 42', 42", 42''', the pressure drop through those passages will lower the pressure in channel 40 to insure that only a small countering force is present on the inner radius $r_2$ of O-rings 53 and 52 (assuming that inner or secondary O-rings are not provided).

For relatively inflexible seal materials or low volume hydraulic systems, the radially inner O-ring seals 55 and 54 are advantageously provided. As the O-rings 55 and 54 have inner radii of $r_3$, smaller than radii $r_1$ of the radially outer O-rings 53 and 52, the effective piston area under the inner sealing surfaces of O-rings 55, 54 is smaller than the area above the outer sealing surfaces of O-rings 53, 52 insuring that a sufficient radially inward force is developed to deform the seal ring 30 into sealing contact with external surface 90 of housing 12.

The inner sealing O-rings 55, 54 may also function as a spring return to assist sealing ring 30 in returning to its original diameter when pressure is released from inlet 50 and conduit 96 (or 98). As the sealing ring 30 deflects inwardly under pressure, it loads the inner seals 55 and 54 which spring back when pressure is relieved.

In operation the remotely controllable rotating valve 20 is driven to the illustrated closed position by applying pressurized hydraulic fluid to conduit 98 via sealing ring 32', port 18 and conduits C2 to drive piston 104 and 106 to the position indicated in FIG. 4. Once in that position valve 22 is returned to its center position and the high pressure line P from source S is removed from conduit 98. Seal ring 32' returns to its non-contacting, underformed state, yet the valve 20 has been moved to close flow path 14 of the tubular member 12.

When it is desired to open valve 20, valve 22 is moved to the open position thereby applying high pressure line P from source S to conduit 96 and seal ring 32. Pressurized hydraulic fluid passes through seal ring 32 and to port 16 and conduits C1 by virtue of the seal effected between sealing surfaces 36 and 38 against external surface 90 of housing 12. The pressurized hydraulic fluid forces piston 104 and piston 106 down causing pinion 112 to turn ninety degrees thereby opening valve 20. Hydraulic fluid previously in chambers 116 and 114 is forced backward through conduits C2 for draining via sealing ring 32' and conduit 98. Such fluid is substantially prevented from leaking from the apparatus by low pressure rotating face seals 80 and 82.

Various modifications and alternations in the described structures will be apparent to those skilled in the art of the foregoing description which does not depart from the spirit of the invention. For this reason, these changes are desired to be included in the appended claims. The appended claims recite the only limitation to the present invention and the descriptive manner which is employed for setting forth the embodiments and is to be interpreted as illustrative and limitative.

What is claimed is:

1. Apparatus for establishing a sealed communication path from a source of pressurized hydraulic fluid to a conduit in a rotating member comprising, a port through an external cylindrical surface of the rotating member, said port communicating with the conduit in the rotating member, seal retainer means non-rotatingly coaxially disposed about said external cylindrical surface of said rotating member, a deformable seal ring means coaxially secured by said seal retainer about said external cylindrical surface of said rotating member at said port through said cylindrical surface, said seal ring means having, an inner diameter which is slightly larger in its undeformed state than an outer diameter of said external diameter of said cylindrical surface of the rotating member, an outer diameter, and a passage in said seal ring means between said outer diameter and said inner diameter, means for controllably applying said pressurized hydraulic fluid to the outer diameter of said seal ring means whereby, said inside diameter of said seal ring means is deformed into sealing contact with said external cylindrical surface of said rotating member only when said pressurized hydraulic fluid is applied to its outer diameter, and said seal ring means establishes fluid communication between said source of pressurized hydraulic fluid and said conduit in said cylindrical member via said passage in said seal ring means and said port in said external surface of said cylindrical member.

2. The apparatus of claim 1 wherein
said port has an axial width on said external cylindrical surface, and wherein said seal ring means includes,
two inner ring sealing surfaces axially separated from each other by a distance greater than said port axial width, and
an annular channel disposed between said two sealing surfaces, and wherein
said two inner ring sealing surfaces are axially disposed on opposite sides of said port of said cylindrical member.

3. The apparatus of claim 2 further comprising primary sealing means disposed radially inwardly from said outer diameter of said seal ring means for sealing said seal ring means with said seal retainer.

4. The apparatus of claim 3 further comprising secondary sealing means for sealing said seal ring means with said seal retainer.

5. The apparatus of claim 1 wherein said seal ring means includes an annular groove disposed about its outer circumference which communicates with said passage.

6. Pressurized fluid communication apparatus comprising,
a cylindrical member having an external diameter and adapted for rotation about its longitudinal cylindrical axis,
a port through an external cylindrical surface of said cylindrical member, said port having an axial width on said external cylindrical surface, said port communicating with a conduit in the wall of said cylindrical member, said conduit adapted to receive pressurized hydraulic fluid,
a deformable member having
an outer surface,
two inner ring sealing surfaces axially separated from each other by a distance greater than said port axial width, said inner ring sealing surfaces in the undeformed state of said deformable member having an internal diameter slightly greater than said external diameter of said cylindrical member,
an annular channel disposed between said two sealing surfaces, and
at least one passage between said outer surface and said annular channel,
a seal retainer means non-rotatingly coaxially disposed about said exterior cylindrical surface of said cylindrical member, said seal retainer defining a retaining slot,
said seal member disposed within said retaining slot with said two sealing surfaces of said seal member facing said cylindrical member exterior surface while being axially disposed on opposite sides of said port of said cylindrical member,
primary sealing means disposed radially inwardly from said outer surface of said seal member for sealing said seal member with said slot,
whereby application of pressurized fluid to said outer surface of said seal member causes it to deform inwardly until said two inner ring sealing surfaces seal against said exterior cylindrical surface operably providing a sealed fluid communication path to said conduit of said cylindrical member via said passage and said channel of said seal member.

7. The apparatus of claim 6 wherein said seal member is fabricated of a reinforced synthetic flourine containing resin.

8. The apparatus of claim 6 wherein said seal member is fabricated of a resilient metallic substance.

9. The apparatus of claim 6 further comprising secondary sealing means disposed radially inwardly from said primary sealing means for sealing said seal member with said slot.

10. The apparatus of claim 6 wherein said retaining slot includes annular lateral walls and wherein said primary sealing means includes left and right hand side O-rings disposed in primary annular lateral slots of said sealing means which face said walls of said seal retainer means which define said slot.

11. The apparatus of claim 10 further comprising
secondary sealing means disposed radially inwardly from said primary sealing means for sealing said seal member with said walls of said slot, and wherein said secondary sealing means includes upper and lower seals disposed in secondary slots in said seal member, inwardly disposed from said primary axially facing slots, defined between said walls of said retaining slot.

12. A remotely operable valve for controlling fluid flow through a rotating tubular member having,
a remotely disposed and controllable source of pressurized hydraulic fluid,
a tubular housing having a flow passage formed therein and having an external diameter, said tubular housing adapted for rotation about its longitudinal axis,
a port through an external surface of said housing, said port having an axial width at its external surface, said port communicating with a conduit in the wall of said tubular housing,
valve means mounted with said rotatable housing for controlling fluid flow through said flow passage,
hydraulic actuating means in fluid communication with said conduit for controlling the operation of said valve means,
a deformable seal member having
an outer surface,
two inner ring sealing surfaces axially separated from each other by a distance greater than said port axial width, said inner ring sealing surfaces in the undeformed state of said deformable member having an internal diameter slightly greater than said external diameter of said tubular housing,
an annular channel disposed between said two sealing surfaces, and
at least one passage between said outer surface and said annular channel,
a seal retainer non-rotatingly coaxially disposed about said exterior surface of said tubular housing, said seal retainer defining a retaining slot having annular opposing facing walls, said seal member disposed within said annular slot with said two sealing surfaces of said seal member facing said exterior surface of said tubular housing while being axially disposed on opposite sides of said cylindrical port, pressure inlet means providing fluid communication from said source of pressurized hydraulic fluid to said outer surface of said deformable seal member, primary sealing means disposed radially inwardly from said outer surface of said seal member for sealing said seal member with said walls of said retaining slot, whereby application of pressurized fluid to said outer surface of said seal member causes it to deform inwardly until said two inner ring sealing surfaces seal against said external surface of said tubular housing operably providing a sealed fluid communication path to said hydraulic actuating means via said hole and said channel of said seal member and via said conduit in said tubular housing operably actuating said valve means.

13. A remotely operably valve for controlling fluid flow through a rotating tubular member having a remotely disposed and controllable source of pressurized hydraulic fluid, a tubular housing having a flow passage formed therein and having an external diameter, said tubular housing adapted for rotation about its longitudinal axis, first and second ports through an external surface of said housing, said ports having axial widths on a housing external surface, said ports respectively communicating with first and second conduits in the wall of said tubular housing, a valve disposed in said flow passage of said tubular housing, said valve having an actuation shaft for rotating said ball valve to an open position and to a closed position for opening or closing said flow passage, a first piston actuator means in fluid communication with said first conduit and coupled to said actuation shaft for rotating said shaft to said open position, a second piston actuator means in fluid communication with said second conduit and coupled to said actuation shaft for rotating said shaft to said closed position, first and second deformable seal members each having, an outer surface, two inner ring sealing surfaces axially separated from each other by a distance greater than said port axial width said inner ring sealing surfaces in the undeformable state of said deformable member having internal diameter slightly greater than said external diameter of said tubular housing, an annular channel disposed between said two sealing surfaces, and at least one hole between said outer surface and said annular channel, a seal retainer non-rotatingly coaxially disposed about said exterior surface of said tubular housing, said seal retainer defining first and second retaining slots, said first and second seal members disposed respectively within said first and second retaining slots with said two sealing surfaces of each of said seal members facing said exterior surface of said tubular housing while respectively each being axially disposed on opposite sides of said first and second ports, first and second pressure inlet means for providing fluid communication from said source of pressurized hydraulic fluid respectively to said outer surface of said first and second seal members, first and second primary sealing means disposed radially inwardly from said outer surface of said first and second seal members for sealing said seal member respectively within said first and second slots, whereby application of pressurized fluid to said outer surface of said first seal member causes it to deform inwardly until its two inner ring sealing surfaces seal against said external surface of said tubular housing operably providing a sealed fluid communication path to said first piston actuator means operably actuating said ball valve to an open position, and whereby application of pressurized fluid to said outer surface of said second seal member causes it to deform inwardly until its two inner ring sealing surfaces seal against said external surface of said tubular housing operably providing a sealed fluid communication path to said second piston actuator means operably actuating said ball valve to a closed position.

* * * * *

Disclaimer 4,700,924.—*John E. Nelson*, Houston; *Raymond J. Smith*, Friendswood, both of Tex. PRESSURE ENERGIZED ROTARY HYDRAULIC SEAL. Patent dated Oct. 20, 1987. Disclaimer filed Mar. 30, 1990, by the assignee Vetco Gray Inc.

Hereby enters this disclaimer to claims 1-3 of said patent.
[*Official Gazette September 18, 1990*]